No. 775,675. PATENTED NOV. 22, 1904.
J. B. GREEN.
VEGETABLE SEED CLEANING MACHINE.
APPLICATION FILED FEB. 13, 1904.
NO MODEL. 4 SHEETS—SHEET 1.

WITNESSES
INVENTOR
JOHN B GREEN
BY
HIS ATTORNEYS

No. 775,675. PATENTED NOV. 22, 1904.
J. B. GREEN.
VEGETABLE SEED CLEANING MACHINE.
APPLICATION FILED FEB. 13, 1904.
NO MODEL. 4 SHEETS—SHEET 2.
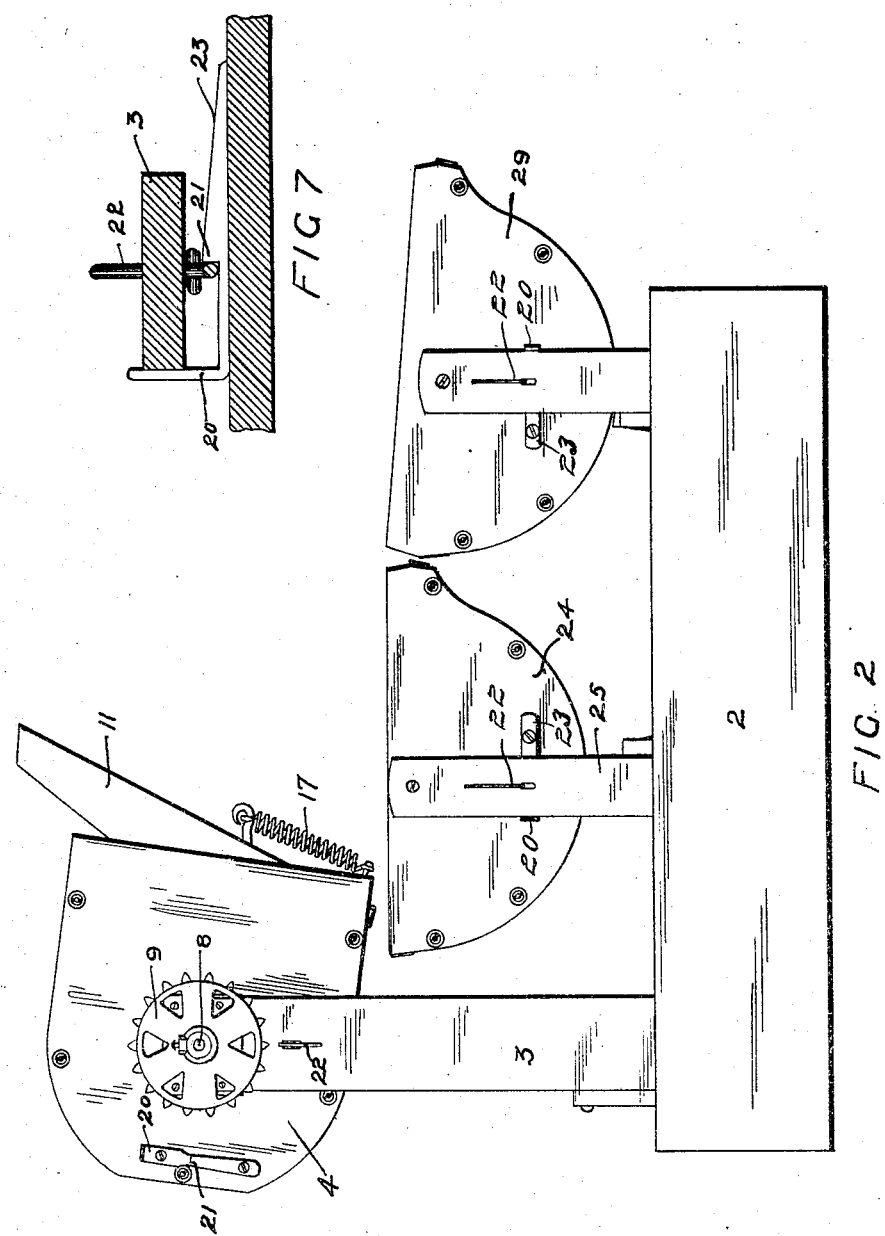
WITNESSES
INVENTOR
JOHN B GREEN
BY
HIS ATTORNEYS

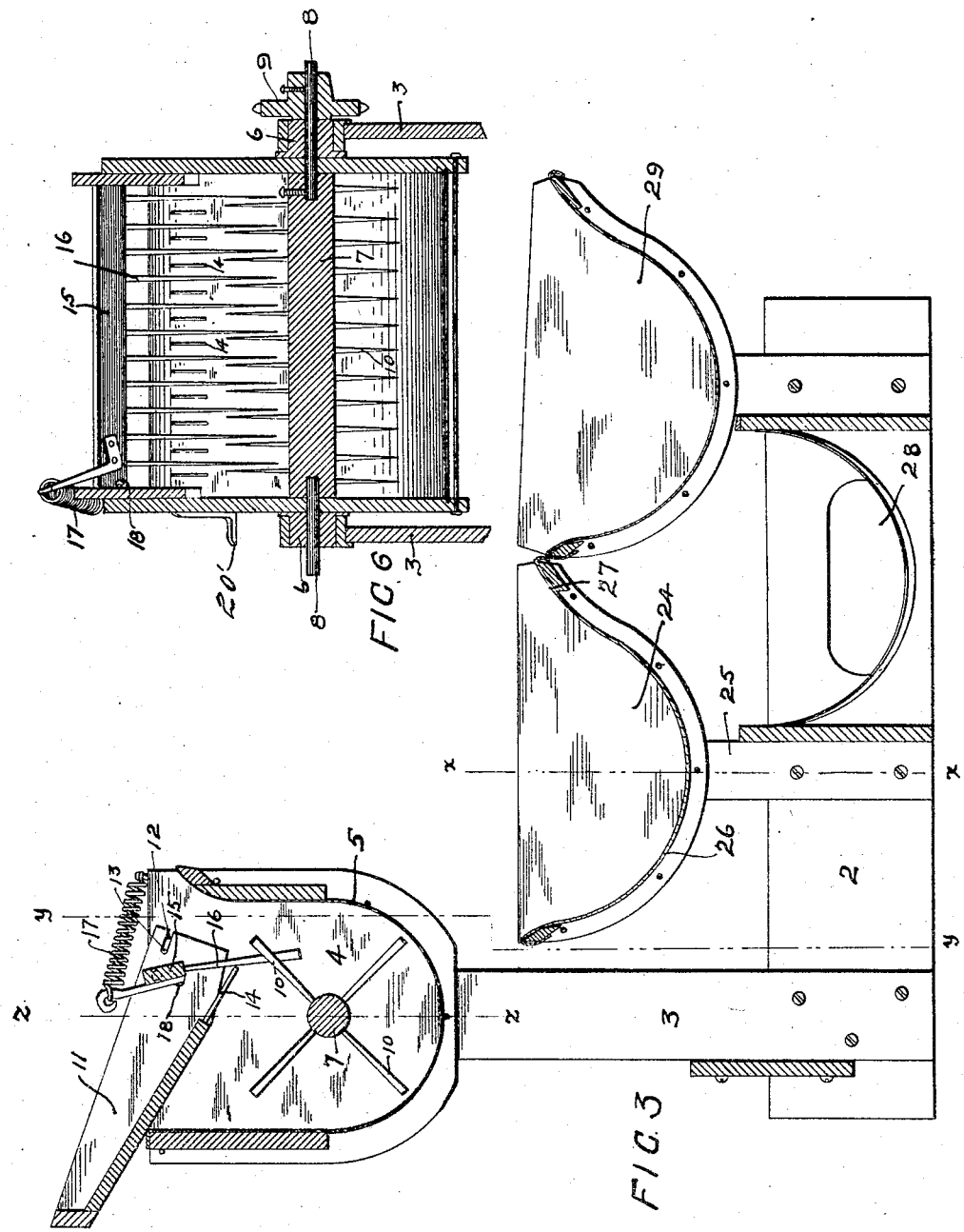

No. 775,675. PATENTED NOV. 22, 1904.
J. B. GREEN.
VEGETABLE SEED CLEANING MACHINE.
APPLICATION FILED FEB. 13, 1904.
NO MODEL. 4 SHEETS—SHEET 4.

WITNESSES
M McInnis
M Hagerty

INVENTOR
JOHN B GREEN
BY Paul & Paul
HIS ATTORNEYS

No. 775,675. Patented November 22, 1904.

UNITED STATES PATENT OFFICE.

JOHN B. GREEN, OF BROOKLYN CENTER, MINNESOTA.

VEGETABLE-SEED-CLEANING MACHINE.

SPECIFICATION forming part of Letters Patent No. 775,675, dated November 22, 1904.

Application filed February 13, 1904. Serial No. 193,365. (No model.)

*To all whom it may concern:*

Be it known that I, JOHN B. GREEN, of Brooklyn Center, county of Hennepin, State of Minnesota, have invented certain new and useful Improvements in Vegetable-Seed-Cleaning Machines, of which the following is a specification.

My invention relates to seed-cleaning machines; and the object of the invention is to provide an apparatus for thoroughly and quickly separating the seeds of pumpkins, squashes, melons, cucumbers, and similar vegetables from soft pulpy interior in which the seeds of such vegetables are embedded.

A further object is to provide means for washing and cleaning the seeds after they are separated from the pulp.

The invention consists generally in various constructions and combinations, all as hereinafter described, and particularly pointed out in the claims.

Figure 1:
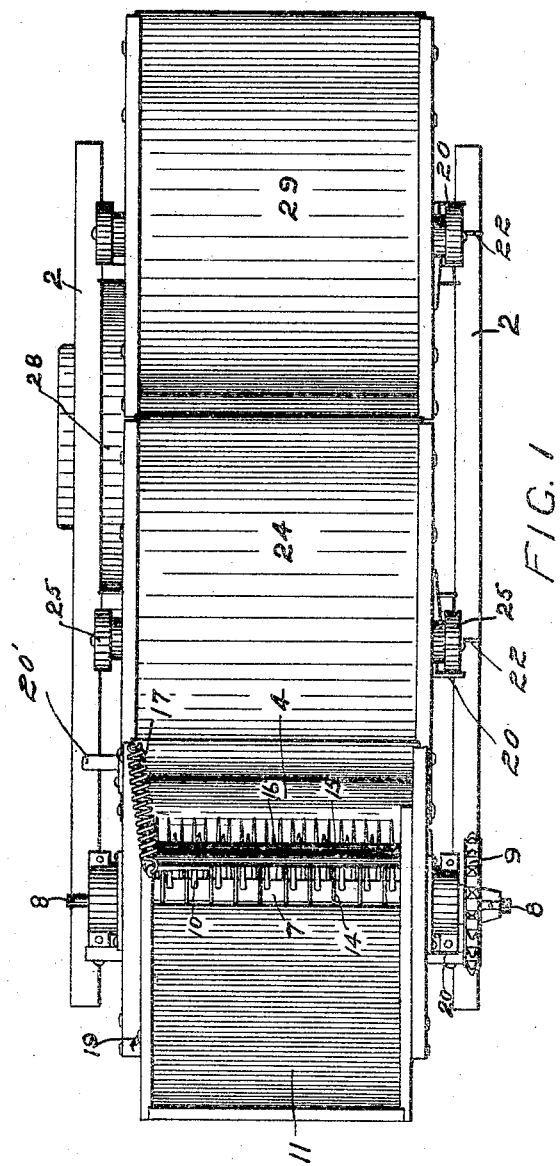
Figure 5:
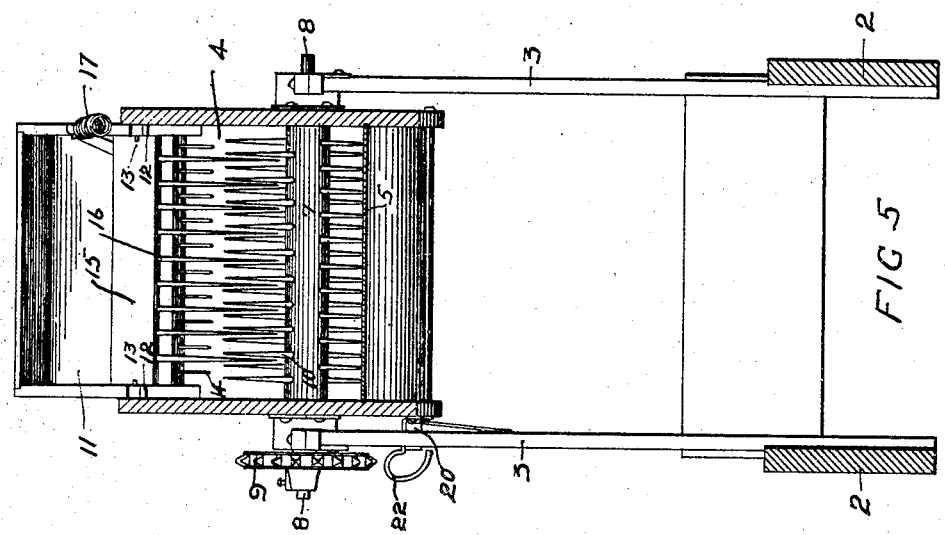
Figure 4:
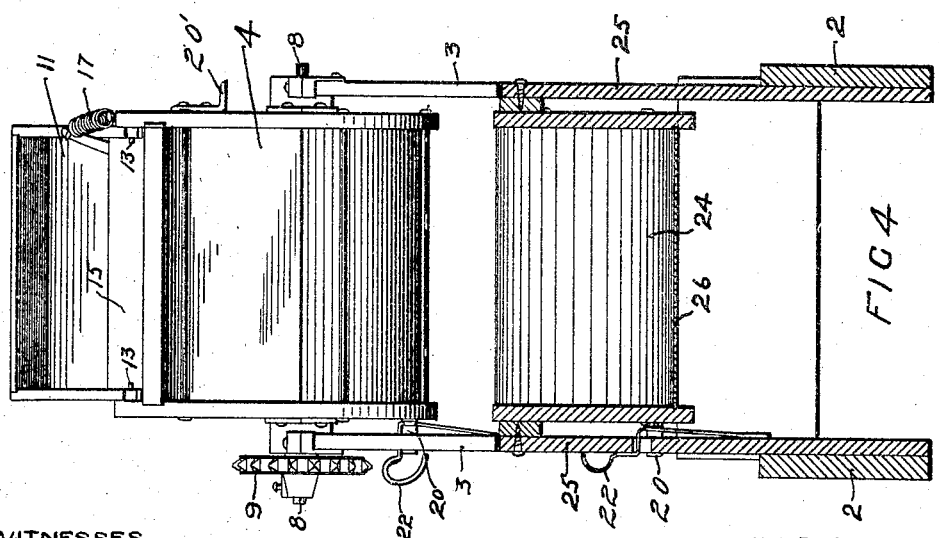

In the accompanying drawings, forming part of this specification, Figure 1 is a plan view of a seed cleaning and washing machine embodying my invention. Fig. 2 is a side elevation of the same, the separating-tank being shown in its tilted position. Fig. 3 is a longitudinal vertical section. Fig. 4 is a vertical section on the line $x\,x$ of Fig. 3. Fig. 5 is a similar view on the line $y\,y$ of Fig. 3. Fig. 6 is a vertical section on the line $z\,z$ of Fig. 3. Fig. 7 is a detail of the locking mechanism for preventing premature tilting of the separating or washing tanks or vats.

In the drawings, 2 represents a suitable base provided at one end with the upright standards 3, supporting an open-topped separating tank or vat 4, containing a supply of water and having a sheet-metal lining 5 to prevent the pulp from adhering to the tank-walls, said lining being preferably semicircular in form at the bottom, as shown in Fig. 3. The tank is provided at each side with gudgeons 6, supported in bearings on the standards 3, and within said tank I provide a drum or cylinder 7, having stub-shafts 8 at each end that pass through the walls of the tank and are journaled centrally in the gudgeons 6. One of these shafts is provided with a driven sprocket-wheel 9. This arrangement permits the cylinder 7 to be revolved independently of the tank and also allows the tank to be tilted to discharge its contents. A series of teeth 10 are provided in the periphery of the cylinder, there being preferably four rows extending longitudinally thereof and radiating therefrom to a point near the wall of the tank. These teeth, as shown in Fig. 6, are arranged so that those of one row alternate in position with those of the adjoining row and their outer ends are slightly flattened, as shown, to form edges that cut and loosen the pulp and separate the seeds therefrom.

Above the revolving toothed cylinder I provide a hopper device 11, having slots 12 in the inner end to receive pins 13 in the side walls of the tank. The bottom of said hopper terminates at a point near the middle of the tank above the revolving cylinder and is provided at its forward edge with a series of projecting fingers 14, that form a continuation of the hopper-bottom. Pivotally supported in the side wall of the hopper above the teeth 14 is a plate or head 15, provided on its lower edge with a series of fingers 16, having flattened lower ends that alternate in position with the fingers 14 and are normally near their ends. This plate and its teeth act as a beater to aid the cylinder in separating the pulp. The fingers 16 also extend down between the teeth of the cylinder and sufficiently near them to coöperate therewith and be kept clean thereby as the cylinder revolves.

I prefer to arrange the fingers 16 upon and near one side of the teeth 10, so that the pulp will not only be cleared off the fingers by the teeth with each revolution of the cylinder, but to insure the complete cutting up and separation of the pulpy material brought up by the teeth. A spring 17 is connected to the tank and to the pivoted head 15 for the purpose of yieldingly holding the fingers 16 in coöperation with the teeth 10 and the fingers 14, but allowing them to yield when the pulp is fed between them. A stop 18, arranged in the side wall of the hopper, limits the inward-swinging movement of the head 15. The hopper 11 is readily detachable from the tank by disconnecting the hook device 19 and disengaging the inner end of the hopper from the pins 13. A stop 20 is preferably provided on the outside wall of the tank in position to engage one of the standards 3 and limit the movement of the tank in one direction, and this stop is provided with a shoulder 21, that is engaged by a spring-catch 22 to normally lock the tank in its upright position. A similar stop 20' limits the movement of the tank in the other direction to prevent its striking the washing-tank. An inclined surface 23, on which the catch slides, allows the tank to be swung to its upright position without manipulating the catch. Near the standards 3 I provide a washing-tank 24, also containing water and pivotally supported upon standards 25 and having a rounded bottom lined with sheet metal 26 and an inclined wall 27 at one end for convenience in discharging the contents. This washing tank or vat is designed to receive the material from the separating tank or vat above, the seeds rising above the pulp to the top of the water with which the tank is supplied. The material may be stirred after being discharged into the washing-tank to cause the seeds to rise to the surface of the water; but ordinarily the seeds and the pulp will be sufficiently separated in the first tank to obviate the necessity of any further separation after being discharged therefrom.

A spout 28 is provided beneath the discharge end of the tank 24 to receive the waste pulp therefrom and discharge it at the side of the machine-frame, and a second tank 29, which I designate as a "rinsing-tank," supplied with water for rinsing purposes, is pivotally supported in the machine-frame near the first-named tank and adapted to receive the seeds that are skimmed off the surface of the water in the washing-tank by means of a suitable rake or skimmer in the hands of the operator. The receiving end of the rinsing-tank 29 is contiguous to and preferably a little below the discharge end of the washing-tank 24, so that the operator can easily rake the seeds from one tank into the other, leaving the pulp behind. After the seeds have been collected in the tank 29 they are raked off upon the drying-screens (not shown) and the rinsing-tank tilted toward the washing-tank and the water discharged into the spout 28. After the seeds have been skimmed from the washing-tank the pulp therein is dumped into the spout 28 and discharged at the side of the machine.

Both the washing and rinsing tanks are provided with stops corresponding to those heretofore described with reference to the separating-tank, and spring-catches are also provided in connection with the washing and rinsing tanks for locking them in their horizontal position.

The following is a brief description of the operation of the machine: The pulp of the pumpkins, squashes, or other similar vegetables from which it desired to extract the seeds is placed upon the separating-tank hopper and allowed to slide down between the fingers into the water in the bottom of the tank. I prefer to place a pailful of water in the tank to a corresponding quantity of pulp. The water will soak into the pulp and soften and loosen the same, and the teeth of the cylinder passing through the mass in the bottom of the tank will whip the pulp and separate the seeds therefrom. Some of the pulp will be carried up by the teeth of the cylinder and will be beaten and shredded by the action of the fingers, which will tend to keep the cylinder-teeth clean. This continued whipping and whirling of the pulp and the subjection of the same to the coöperating action of the cylinder-teeth and fingers will quickly tear it apart and expose all the seeds. The preliminary separation of the pulp between the hopper and beater fingers and the continued whirling and whipping of the same by the teeth of the cylinder will insure a perfect separation of the pulp and seeds, so that when the contents of the separating-tank are discharged the seeds will be so effectually loosened that they will rise to the surface of the water, where they can be easily and quickly skimmed off as soon as the pulp is dumped into the washing-tank. A suitable amount of water, preferably two pailfuls, will be kept in the washing-tank, while a larger quantity, preferably three pailfuls, will be maintained in the rinsing-tank, where the seeds will be thoroughly cleaned and rinsed preparatory to being raked or skimmed out upon the drying-screens. As soon as the separating-tank has been emptied of its contents the operator can begin to skim the seeds from the top of the water in the washing-tank into the rinsing-tank, and the separating-tank can be raised to its upright position and the feeding of pulp thereto resumed.

I claim as my invention—

1. The combination, with a tilting tank having a closed rounded bottom, of a cylinder mounted within said tank and provided with a series of teeth arranged to sweep over said bottom, the teeth on one side of said cylinder alternating in position with those on the other side, a hopper, and a series of teeth provided in the lower end of the bottom thereof and in substantially the same plane as said bottom and between which hopper-teeth the teeth of said cylinder pass as said cylinder is revolved, for the purpose specified.

2. The combination, with a tilting tank having a closed rounded bottom, of a revolving cylinder arranged therein and provided with a series of teeth having flattened outer ends that are adapted to sweep over said closed bottom when said cylinder is revolved, the teeth on one side of said cylinder alternating in position with those on the other side, a hopper arranged in said tank, and a series of teeth or fingers provided in the bottom of said hopper and forming a continuation thereof and arranged to coöperate with the teeth of said cylinder.

3. The combination, with a tank having a closed bottom, of a revolving toothed cylinder mounted therein, a hopper provided above said cylinder, and a beater having a series of fingers and yieldingly supported and depending within said tank and coöperating with the teeth of said cylinder.

4. The combination, with a tank having a closed bottom, of a revolving cylinder mounted therein, a hopper carried by said tank, a spring-pressed beater having a series of fingers depending within said tank and held toward the bottom of said hopper, said fingers depending between and near the teeth of said cylinder, for the purpose specified.

5. The combination, with a tank having a closed bottom, of a revolving cylinder having a series of teeth mounted therein, a hopper, and a series of fingers provided in said hopper and arranged to coöperate with the teeth of said cylinder, and a beater carried by said hopper and having a series of fingers depending below said hopper-fingers, for the purpose specified.

6. The combination, with a tilting tank, of a revolving toothed cylinder provided therein, a hopper having a series of fingers provided in said tank, and a beater having a series of yieldingly-held fingers arranged at an angle to said first-named fingers and near the same and depending between the teeth of said cylinder.

7. The combination, with a tilting tank adapted to contain a supply of water, of a revolving toothed cylinder mounted therein, a hopper provided above said cylinder and having a series of fingers, a pivoted beater-head, a series of fingers carried thereby and depending past the ends of said first-named fingers and between the teeth of said cylinder, and means for yieldingly holding said last-named fingers toward said first-named fingers.

8. The combination, with a tilting tank adapted to contain a supply of water, of a revolving toothed cylinder mounted therein, a hopper detachably connected with said tank above said cylinder, a series of forwardly-projecting teeth provided in the bottom of said hopper, a spring-pressed beater-head provided in said hopper, a stop for limiting the movement of said head, and a series of fingers provided in the lower edge of said head and depending past the ends of said hopper-fingers and between the ends of said cylinder-teeth.

In witness whereof I have hereunto set my hand this 9th day of February, 1904.

JOHN B. GREEN.

In presence of—
EUGENE K. GREEN,
RICHARD PAUL.